Aug. 6, 1957 E. S. DAKIN 2,801,568
MICROSCOPE SLIDE
Filed Nov. 15, 1954

INVENTOR.
EVELYN S. DAKIN
BY
L. S. Saulsbury
ATTORNEY

_2,801,568_

MICROSCOPE SLIDE

Evelyn S. Dakin, New York, N. Y.

Application November 15, 1954, Serial No. 468,741

3 Claims. (Cl. 88—40)

This invention relates to an improved microscope slide and more particularly to an improved microscope slide to which the material to be examined will adhere better than to smooth glass and which will diffuse the light and reduce the glare from the source of illumination.

In microscopic work, the material to be examined is usually first placed, spread or smeared upon a thin clear slide made of glass. Before the actual examination can be made, the material on the slide may require fixing and perhaps also staining. The fixing and staining operations involve liquid treatments which, despite the greatest care on the part of the operator, may remove from the slide a portion of the material to be examined.

In some cases, especially if the material under examination is of non-mucoid type, so much of the secretion or tissue washes off that an accurate microscopic interpretation or diagnosis cannot be made. When part of the material is removed, the examination cannot be considered as accurate. It is a waste of valuable time to process and examine inadequate material as the result is often misleading to the physician. In cases where all of the specimen available is smeared on the slide and lost, it is sometimes impossible to repeat the test as it may involve an operative procedure.

This difficulty has been overcome in part by spreading the slide with a thin film of albumin. This helps the smear or specimen to adhere to the glass, but it tends to obscure the cellular detail, especially in the case of fluid specimens or secretions, where the liquids mix with the albumin. The tissues are placed on top and therefore do not create the same problem.

It has been discovered that material, such as the non-mucoid, which may be washed off the smooth slides during routine fixing and staining operations, will adhere to finely roughened slides during the same treatments. It has also been discovered that the routine mounting and oil immersion procedures make the opaque finely roughened slide surface perfectly transparent, for the refractive index of glass is substantially the same as that of the mounting material and of the oil. The fine roughening reduces glare, eliminates eye fatigue, yet excellent definition is obtained. The use of finely roughened slides enables more chance of diagnosis by helping to eliminate slide spoilage caused by washing off the smear; it also saves time, the cytologic examination being made easier because there are more cells for study than on a similar smear spread on a smooth slide.

It is thus the principal object of this invention to provide a microscopic slide of clear or blue glass having a finely roughened top or specimen-bearing surface to which the material to be examined will adhere.

It is a further object of the invention to provide a finely roughened slide surface which will reduce the glare from the source of illumination.

It is a still further object of the invention to provide a microscope slide having finely roughened top and bottom surfaces to improve specimen adhesion and to reduce the glare from the source of illumination.

It is a further object of the invention to provide a microscope slide having at least one frosted or finely roughened surface to improve specimen adhesion or to reduce the glare from the source of illumination.

For other objects and a better understanding of the invention, reference may be had to the following detailed description taken in connection with the accompanying drawing, in which.

Figure 1:
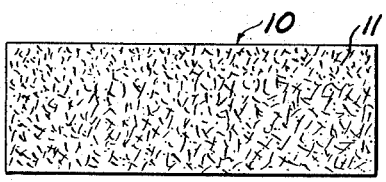
Figure 1 is a top plan view of a slide which has one finely roughened surface.
Figure 2:
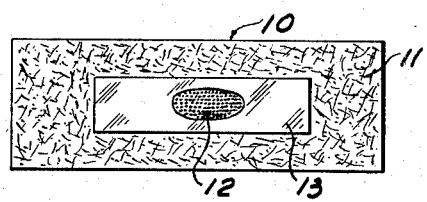
Fig. 2 is a top plan view of a slide similar to the one shown in Fig. 1 with a specimen smeared and mounted on the finely roughened surface and having a cover glass over the smear which has been mounted with a mounting media.
Figure 3:
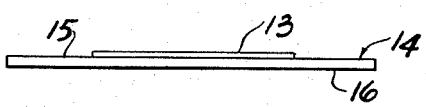
Fig. 3 is a side view of the slide and cover glass shown in Fig. 2.

In Figs. 1, 2 and 3 of the drawings, 10 is a flat glass microscope slide plate which, by way of example only, may be 1.10 mm. thick, 25 mm. wide and 75 mm. long. The top flat surface 11 of the slide 10 has a finely roughened, etched or frosted finish to provide a plurality of minute raised sharp cutting formations. This finish may be prepared by emery grinding, the emery ranging from a number 200 to 150 (Opplem) or by mud grinding to a range identified as or compared to a scale number 30–40 or scales close thereto, where the fine, or satin, and rough finishes are identified on scales from 60 to 2 (Teitelbaum). Such roughening may also be effected with hydrofluoric acid, by sand blasting or by any other suitable method. The slides are made from a clear or slightly blue-tinged non-corrosive glass with flat surfaces and bevel ground edges. In Fig. 2, a specimen 12 has been smeared upon finely roughened top surface 11 and fixed, stained and mounted thereon by methods suitable for the material under examination. A clear glass cover plate 13, usually of 0.17 to 0.25 mm. and of the type generally used in microscopic work has been placed over smear 12. It will be seen that the area under cover glass 13 is perfectly clear. This is because the mounting material, or medium, such as Permount or Canada balsam, has substantially the same refractive index as the glass. The smear stands out distinctly because the finely roughened or ground surface 11 practically eliminated smear wash-off during the liquid treatments.

Figure 4:
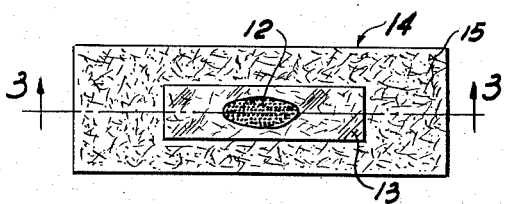
Fig. 4 is a top plan view of a slide having finely roughened top and bottom surfaces with a specimen smeared and mounted on the top surface and having a cover glass mounted with mounting media over the smear.

In Figs. 3 and 4, a glass microscope slide plate 14, generally similar to that shown in Figs. 1, 2 and 3, is finely roughened or frosted on top plat surface 15 and also on bottom flat surface 16, using one of the methods described above. A specimen 12 has been smeared upon finely roughened top surface 15 and fixed, stained and mounted thereon by methods suitable for the material under examination. The smear is usually prepared by transferring the specimen material to the slide from an instrument which collects it. The frosted glass slide of the present invention may save time in the collection of certain specimens, such as from visible and accessible parts by simply rubbing and scraping the frosted slide over the lesion or part of the subject material being examined. The cells will adhere directly to and be retained on the frosted glass better than to smooth glass used heretofore. A clear cover glass plate 13 has been placed over smear 12. It will be seen that the area of frosted top surface 15 which makes contact with the mounting media lying under cover glass 13 appears to be clear while the entire area of bottom surface 16 still appears to be frosted. The smear stands out distinctly because the finely roughened top surface 15 held the smear during the liquid treatments. Finely roughened bottom surface greatly reduces glare from the microscope lamp. This slide can be used effectively for student purposes when usually a common incandescent bulb is the source of illumination. The frosted slide will give much less eye fatigue than the clear glass slide under similar conditions.

Figure 5:
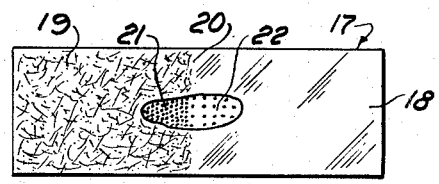
Fig. 5 is a top plan view of a slide which is finely roughened at one end and smooth at the other with a fixed or stained smear which has been spread equally upon the finely roughened and smooth surfaces.

The practical advantages of the finely roughened slide surface are graphically illustrated in Fig. 5 where a slide 17, generally similar to the slides shown in Figs. 1 through 4, is provided with a smooth end 18 and a frosted end 19, similar to frosted surface 11 of slide 10, Fig. 1. Smear 20 was produced by smearing a specimen uniformly on the slide so that half of the smear was on the frosted area 19 and half was on the clear area 18. The smear was then fixed, stained and mounted. Portion 21 of the smear on the frosted area is seen to be much heavier than portion 22 on the clear glass area. Since the only variable was the fine roughening of half the slide, it is clear that such glass does retain the smears much better than clear glass.

The slide made from the blue-tinged glass such as ordinarily used as a light filter may be preferred by microscopists as it may further reduce eye fatigue.

The frosted slides may also be used for routine work where mounts are not required, such as for bacteriological and haemotological work where the oil immersion lens is used, or in any other study where oil is used. They offer particular advantages when specimens are watery and non-mucoid and are most useful as an aid in the cytologic diagnosis of early cancer.

While various changes may be made in the detail construction, it shall be understood that such changes shall be within the spirit and scope of the present invention as defined by the appended claims.

What is claimed is:

1. A microscopic slide comprising a specimen-bearing slide plate having a flat roughened specimen-collecting surface, said surface comprised of a plurality of minute raised sharp cutting formations for scraping specimens from the material to be examined and for affixing said collected specimen to said surface, a clear cover plate and an adhesive of substantially the same refractive index as the clear plate for securing said cover plate to the slide plate over the specimen whereby to render the specimen bearing area to be made transparent through the roughened surface.

2. A microscopic slide as defined in claim 1 and said roughened surface extending throughout the full area of the slide plate and said clear cover plate being of less area than the slide plate to allow for an uncovered roughened surface area.

3. A microscopic slide as defined in claim 1 and said slide plate having an opposite flat side surface of similar roughened formation that underlies the first surface to diffuse and reduce light glare when the slide is used in the microscope.

References Cited in the file of this patent

UNITED STATES PATENTS

| | | |
|---|---|---|
| 1,630,146 | Trenner | May 24, 1927 |
| 1,996,141 | Broadhurst et al. | Apr. 2, 1935 |
| 2,098,955 | Draeger | Nov. 16, 1937 |
| 2,235,310 | Bausch | Mar. 18, 1941 |

FOREIGN PATENTS

| | | |
|---|---|---|
| 202 | Great Britain | of 1884 |